United States Patent
Martin et al.

(10) Patent No.: US 7,606,900 B2
(45) Date of Patent: Oct. 20, 2009

(54) REGULATING ACCESS TO A SCARCE RESOURCE

(75) Inventors: Sean James Martin, Boston, MA (US); Chetan Ram Murthy, Boston, MA (US); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/917,536

(22) Filed: Jul. 27, 2001

(65) Prior Publication Data
US 2003/0023734 A1  Jan. 30, 2003

(51) Int. Cl.
G06F 15/173  (2006.01)
(52) U.S. Cl. .................................. 709/225
(58) Field of Classification Search ............. 709/225, 709/226, 228, 229
See application file for complete search history.

(56) References Cited

U.S. PATENT DOCUMENTS

| | | | |
|---|---|---|---|
| 5,982,780 A | | 11/1999 | Bohm et al. |
| 6,011,537 A * | | 1/2000 | Slotznick .................... 345/733 |
| 6,094,677 A * | | 7/2000 | Capek et al. ................ 709/219 |
| 6,330,719 B1 * | | 12/2001 | Zigmond et al. ............ 725/121 |
| 6,338,089 B1 * | | 1/2002 | Quinlan ...................... 709/227 |
| 6,389,028 B1 * | | 5/2002 | Bondarenko et al. ........ 370/401 |
| 6,415,027 B1 | | 7/2002 | Malik |
| 6,463,457 B1 * | | 10/2002 | Armentrout et al. ......... 709/201 |
| 6,584,097 B1 | | 6/2003 | Malik |
| 6,606,661 B1 * | | 8/2003 | Agrawal et al. ............. 709/227 |
| 6,714,536 B1 * | | 3/2004 | Dowling ..................... 370/356 |
| 6,724,764 B2 * | | 4/2004 | Bondarenko et al. ........ 370/401 |
| 6,801,906 B1 * | | 10/2004 | Bates et al. ..................... 707/3 |
| 6,820,260 B1 * | | 11/2004 | Flockhart et al. ............ 717/173 |
| 6,823,392 B2 | | 11/2004 | Cherkasova et al. |
| 6,832,255 B1 * | | 12/2004 | Rumsewicz et al. ......... 709/227 |
| 6,859,834 B1 * | | 2/2005 | Arora et al. ................. 709/227 |
| 6,990,525 B1 | | 1/2006 | Ying et al. |
| 6,993,559 B2 * | | 1/2006 | Jilk et al. .................... 709/206 |
| 7,269,637 B2 * | | 9/2007 | Kubo .......................... 709/219 |
| 7,477,659 B1 * | | 1/2009 | Nee et al. .................... 370/468 |
| 7,483,964 B1 | | 1/2009 | Jackson et al. |
| 2002/0004833 A1 | | 1/2002 | Tonouchi |
| 2002/0053029 A1 | | 5/2002 | Nakamura et al. |

(Continued)

OTHER PUBLICATIONS

Martin et al., U.S. Appl. No. 09/916,792, filed Jul. 27, 2001, Notice of Allowance and Fee(s) Due, Mar. 11, 2009, 5 pages.

(Continued)

*Primary Examiner*—Douglas B Blair
(74) *Attorney, Agent, or Firm*—Hoffman Warnick LLC

(57) ABSTRACT

The invention relates to regulating access by users to a scarce resource, wherein the resource is capable of handling multiple concurrent accesses. A request for access to the scarce resource is received and it is determined whether the access level for the scarce resource is at a desired maximum. Responsive to determining that said access level is at a desired maximum, the requester is placed in a queue for access to said scarce resource. The requester is then provided with a notification that the request has been enqueued. Access is available to the requester upon reaching the head of the queue when the access level drops below the desired maximum.

38 Claims, 8 Drawing Sheets

U.S. PATENT DOCUMENTS

| | | |
|---|---|---|
| 2002/0059436 A1 | 5/2002 | Kubo |
| 2002/0083342 A1 | 6/2002 | Webb et al. |
| 2002/0133593 A1 | 9/2002 | Johnson et al. |
| 2002/0194251 A1 | 12/2002 | Richter et al. |

OTHER PUBLICATIONS

Martin et al., U.S. Appl. No. 09/916,792, filed Jul. 27, 2001, Office Action Summary, Sep. 29, 2004, 8 pages.

Martin et al., U.S. Appl. No. 09/916,792, filed Jul. 27, 2001, Office Action Summary, Mar. 1, 2005, 6 pages.

Martin et al., U.S. Appl. No. 09/916,792, filed Jul. 27, 2001, Office Action Summary, Sep. 8, 2005, 11 pages.

Martin et al., U.S. Appl. No. 09/916,792, filed Jul. 27, 2001, Office Action Summary, Mar. 20, 2006, 12 pages.

Martin et al., U.S. Appl. No. 09/916,792, filed Jul, 27, 2001, Office Action Summary, Mar. 29, 2007, 12 pages.

Martin et al., U.S. Appl. No. 09/916,792, filed Jul. 27, 2001, Office Action Summary, Oct. 18, 2007, 12 pages.

Martin et al., U.S. Appl. No. 09/916,792, filed Jul. 27, 2001, Office Action Summary, May 28, 2008, 16 pages.

* cited by examiner

REGULATING ACCESS TO A SCARCE RESOURCE

RELATED APPLICATION

This patent application is related to co-pending U.S. patent application Ser. No. 09/916,792, which is being filed on the same day.

FIELD OF THE INVENTION

The present invention relates to regulating user access to a scarce resource (e.g. the whole or part of a frequently accessed application or web site).

DESCRIPTION OF THE RELATED ART

In any distributed client-server environment, client's (users; or client applications) typically compete for access to applications running at a server. As more and more clients try to an access an application or a part(s) thereof, the processing load/the load on other limited resource such as memory; disk; I/O bandwidth etc. increases. This is especially true if frequent accesses to one part of the application is particularly processor; resource; memory; I/O etc. intensive. Performance therefore typically degrades as the server struggles to cope with the load. Since users are frequently unforgiving, this is a worrying situation for the owner of such a server, or indeed the owner of a popular application. If response times become too poor, then users will invariably take their business elsewhere.

Some companies have addressed the problem by increasing server capacity. They have replaced old and struggling machines with bigger and better ones. This is however costly and in any case, it is difficult to keep pace.

One environment of particular concern is the World Wide Web. Probably the biggest problem facing e-commerce web sites today, is that if an online attraction (e.g. a shop) proves very popular and the server hosting the site approaches maximum capacity, there is no satisfactory means of limiting the flow of customers into the site. This often results in a degraded browsing/shopping experience for people already on the site, and in extreme cases will lead to the overload and failure of the site.

As alluded to above, in some situations access to the majority of the site may not be a problem. Rather access to a particular part (e.g. the checkout at a shopping site) may be especially resource intensive thereby degrading the experience for others accessing that part or indeed accessing the whole site.

Such an experience will typically cause customers to become frustrated. They will often go straight to a competitor's web site.

U.S. Pat. No. 6,154,769 discloses a partial solution to the problem. It teaches queuing of access to a web server. Whilst this effectively limits the number of users able to gain access to the server, it moves the frustration factor away from the users navigating a site and onto the users queuing for access. Typically a user's system (client) just hangs until access is granted.

SUMMARY OF THE INVENTION

Accordingly the invention provides a method for regulating access by users to a scarce resource, said resource being capable of handling multiple concurrent accesses, the method comprising the steps of: receiving a request for access to the scarce resource; determining whether the access level for said scarce resource is at a desired maximum; responsive to determining that said access level is at a desired maximum, placing said requester in a queue for access to said scarce resource; and providing said requester with a notification that the request has been enqueued, access being available to said requester upon reaching the head of the queue and said access level dropping below said desired maximum.

Thus the number of users accessing the scarce resource is controlled and performance is therefore maintained at an acceptable level. Users' frustration at poor response times is mitigated and they are less likely to take their business elsewhere.

It will be appreciated that this is different from the invention disclosed by UK Patent 2 329 046. This patent applies queuing to the traditional help desk based scenario, via an online system. In this instance the scarce resource is the support specialist. However, each specialist is only capable communicating with users on a one to one basis. The specialist is not capable of handling multiple concurrent accesses.

According to a preferred embodiment, the requester is provided with periodic updates on their progress through the queue.

According to a preferred embodiment of the present invention, the requester is issued with a numbered ticket denoting said requester's position in the queue. In one embodiment the number is displayed to the requester.

Preferably the step of periodically providing the requester with updates on the requester's progress through the queue comprises informing the requester of the ticket number of the last user granted access to the scarce resource.

In one embodiment the average time taken to serve the holder of each ticket number is calculated and the requester is then provided with an estimated time to wait based on the calculated average.

By providing the number of the last ticket served; an estimated time to wait; or both, the requester can track their progress through the queue. This is much less frustrating than the prior art methods which typically hang a user's system until access can be granted. Queued users are now much more likely to persevere than to divert their attention to a competitor's scarce resource.

Of course a client application may be requesting the access without any human intervention. In which case, the application is able to get on with other tasks whilst it waits for its ticket number to come up.

In order to encourage a user's continued attention, the requester is preferably provided with entertainment whilst in the queue. In one embodiment, the entertainment is remote from the scarce resource. This remoteness is particularly useful if the entertainment is processor; memory; I/O; resource etc. intensive.

Such entertainment may include adverts; online gaming etc. It prevents boredom from setting in and is also perfect for creating additional buy opportunities. For example, if the scarce resource is an internet shop checkout, then the shop can provide the requester with their own promotional offers.

In one embodiment, the step of periodically providing the requester with updates is responsive to the requester polling for such updates. An executable program is preferably downloaded onto the requester's computer in order to initiate the polling. The invention is particularly applicable (although not limited to) accessing a scarce resource in a web-based environment, in which case the executable program may be a Java applet (Java is a trademark of Sun Microsystems Inc.); COM object; javascript program (all of which are typically executable within an internet browser). Alternatively a separate application may be downloaded onto the requester's computer. Java applets; COM objects and javascript programs typically do not store any persistent state, in the sense that once a web page containing them is disconnected, the information gathered from a user session is lost. Thus if the requester is denied access to the scarce resource and decides to browse other parts of the web whilst in the queue, then they will typically need to be re-queued upon returning to the web site hosting the resource. (Those tasks which aren't web based may naturally be continued with a web session connected to the page hosting the applet running in the background.) The advantage of using a separate application is that this application can be receiving and displaying information in the background whilst the requester browses other web sites (this is helpful with regard to the aforementioned client applications polling for access to the scarce resource without any human intervention, as well as when it is a human requesting access). Of course it is still possible to continue browsing other web sites when using an applet because a new browser session may be opened for this purpose.

In one embodiment, information is stored on the requester's position in the queue, along with information for the purpose of providing the requester with appropriate notifications (e.g. via contact details). The positional information is continually updated as said requester progresses through the queue. Preferably periodic updates to the requester are then initiated (of course the requester may also poll for updates). Further preferably, the requester is provided with a notification when access to the scarce resource is available. In one embodiment this means that the requester can, if they so choose, browse other internet sites and generally get on with other tasks whilst they wait for this notification. It will be appreciated that there is preferably a permanent connection to the requester in order for such updates/the notification to be automatically sent to the requester but the connection may also be initiated to the requester for the purpose of notification. With regards to a web environment, an HTTP firewall typically prevents long running HTTP connections from a Web browser. A message broker setup, using a publish/subscribe model, is therefore preferably used to solve this problem. This model is also particularly useful when the requester is a client-application acting without human intervention—the client application can perform other tasks until it receives notification that access is available.

In one embodiment, the step of storing requester information is responsive to determining that said requester is within a predetermined threshold of the head of the queue. This is particularly applicable to the situation where the connection is not permanent and a Java applet is repeatedly polling for access. In one embodiment, the applet attempts to keep the connection open as the requester nears the head of the queue so as not to miss out when access becomes available. The contact information stored is then used to inform a requester when access becomes available. Of course if the connection gets dropped then the applet can continue polling for access as before.

In one embodiment, the step of periodically providing the requester with updates is responsive to said requester re-requesting access to said scarce resource. In the web environment this could be by prompting the requester to hit the browser "reload" button. Alternatively this may be achieved by some javascript running within a web page from which access can be requested. As another alternative an HTML client refresh tag could be used to prompt a request every N seconds. These are by way of example only.

Preferably each re-request presents a ticket number issued to the requester upon being placed in said queue and said presented ticket number is used to determine whether access is available to said requester. In one embodiment the requester's ticket number is stored as a client-side browser cookie. Responsive to determining that access is available, access is preferably granted.

In one embodiment the step of granting access comprises diverting said request for access to a first server hosting said scarce resource. Responsive to determining that access is not available, the requester is preferably diverted to a second server which provides the requester with entertainment whilst in the queue. It is particularly advantageous to filter requests in this way because continuous requests for access to the first server could severely impact server performance. The filtering avoids this.

In the preferred embodiment, the step of determining whether the access level for the scarce resource is at a desired maximum comprises tracking the number of users currently accessing the scarce resource. This number is then compared with a predetermined maximum value.

In one embodiment, if a request for access to the scarce resource is received from the requester and the requester has missed access when available, it is determined whether the scarce resource is able to accommodate access by the requester. Responsive to determining that it is possible to accommodate access by the requester, that access is granted. Responsive to determining that it is not possible to accommodate access by the requester, the requester is re-queued. Whilst there is a desired maximum access level, it will be appreciated that performance may not be degraded too much by allowing the odd latecomer access. Such flexibility only adds to user satisfaction.

According to another aspect, the invention provides an apparatus for regulating access by users to a scarce resource, said resource being capable of handling multiple concurrent accesses, the apparatus comprising: means for receiving a request for access to the scarce resource; means for determining whether the access level for said scarce resource is at a desired maximum; means, responsive to determining that said access level is at a desired maximum, for placing said requester in a queue for access to said scarce resource; and means for providing said requester with a notification that the request has been enqueued; access being available to said requester upon reaching the head of the queue and said access level dropping below said desired maximum.

According to another aspect, the invention provides a method for requesting access to a scarce resource, said resource being capable of handling multiple concurrent accesses and access to said scarce resource being regulated, said method comprising the steps of: requesting access to said scarce resource; and receiving a message that said access is not currently available and that said request has been queued, access being available upon reaching the head of the queue and an access level for said resource dropping below a desired maximum.

Preferably the requester is sent periodic updates on their progress through the queue.

Preferably a numbered ticket is received denoting said requester's position in the queue. Preferably the ticket number is displayed.

In one embodiment, the step of periodically receiving updates on progress through the queue comprises receiving the ticket number of the last user granted access to said scarce resource. In one embodiment, the last ticket number is received. It may be displayed to the requester. In another embodiment an estimated time to wait based on a calculated average is received. This may be displayed to the requester. Of course both may be displayed.

In one embodiment, updates are periodically polled for (the calculated time estimate received may be used to determine when next to poll). Responsive to determining that the head of the queue is within a predetermined threshold, the polling period is decreased. This is so not to miss out on access when it becomes available.

In one embodiment, access to the scarce resource is periodically re-requested. This preferably involves presenting a ticket number issued upon being placed in said queue, the presented ticket number being used to determine whether access is available to the requester.

In one embodiment, the requester receives a notification when access to the scarce resource is available.

According to another aspect, the invention provides an apparatus for requesting access to a scarce resource, said resource being capable of handling multiple concurrent accesses and access to said scarce resource being regulated, said apparatus comprising: means for requesting access to said scarce resource; and means for receiving a message that said access is not currently available and that said request has been queued, access being available upon reaching the head of the queue and an access level for said resource dropping below a desired maximum.

According to another aspect, the invention provides a computer program comprising program code adapted to perform the steps of: receiving a request for access to the scarce resource, said resource being capable of handling multiple concurrent accesses; determining whether the access level for said scarce resource is at a desired maximum; responsive to determining that said access level is at a desired maximum, placing said requester in a queue for access to said scarce resource; and providing said requester with a notification that the request has been enqueued, access being available to said requester upon reaching the head of the queue and said access level dropping below said desired maximum.

According to another aspect, the invention provides a computer program for requesting access to a scarce resource, said resource being capable of handling multiple concurrent accesses and said access being regulated, said program comprising program code adapted to perform the steps of: requesting access to said scarce resource; and receiving a message that said access not currently available and that said request has been queued, access being available upon reaching the head of the queue and an access level for said resource dropping below a desired maximum.

BRIEF DESCRIPTION OF THE DRAWINGS

Embodiments of the present invention will now be described, by way of example only, and with reference to the following drawings.

DETAILED DESCRIPTION OF THE PREFERRED EMBODIMENTS

Figure 1:
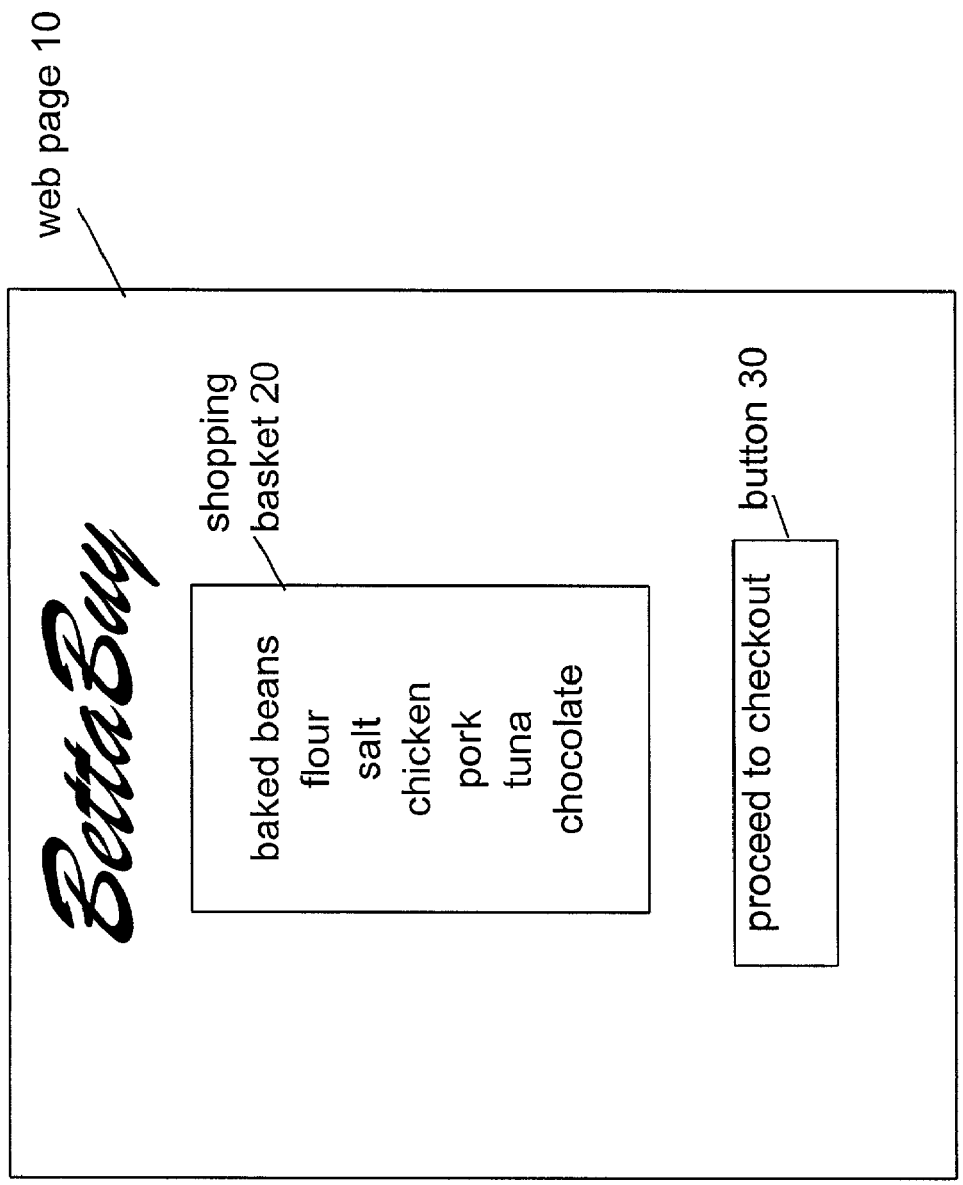
FIG. 1 shows a front-end to an example scarce resource in accordance with a preferred embodiment of the present invention.

The front-end to an example scarce resource, in accordance with a preferred embodiment of the present invention, is shown in FIG. 1. Web page 10 is part of a shopping site hosted by a company, BettaBuy. The web page shows how a user has compiled a shopping basket 20 of food items. In order to process the transaction, the user presses the "proceed to checkout" button 30. In this example, the checkout is the scarce resource. Of course, the scarce resource could equally comprise the whole web site, not just a part thereof.

Figure 2:
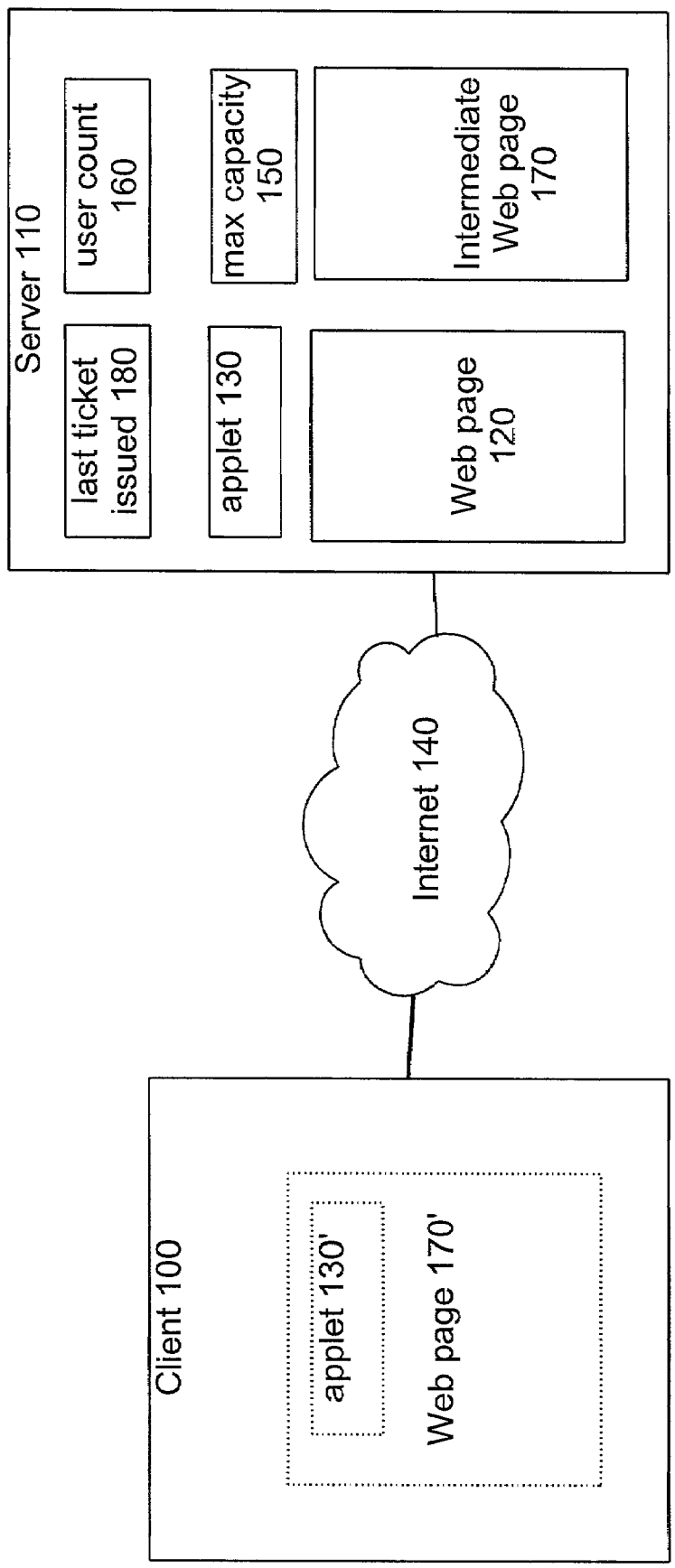
FIGS. 2, 3*a* and 3*b* illustrate web site access to a scarce resource according to a first embodiment of the present invention.
Figure 3A:
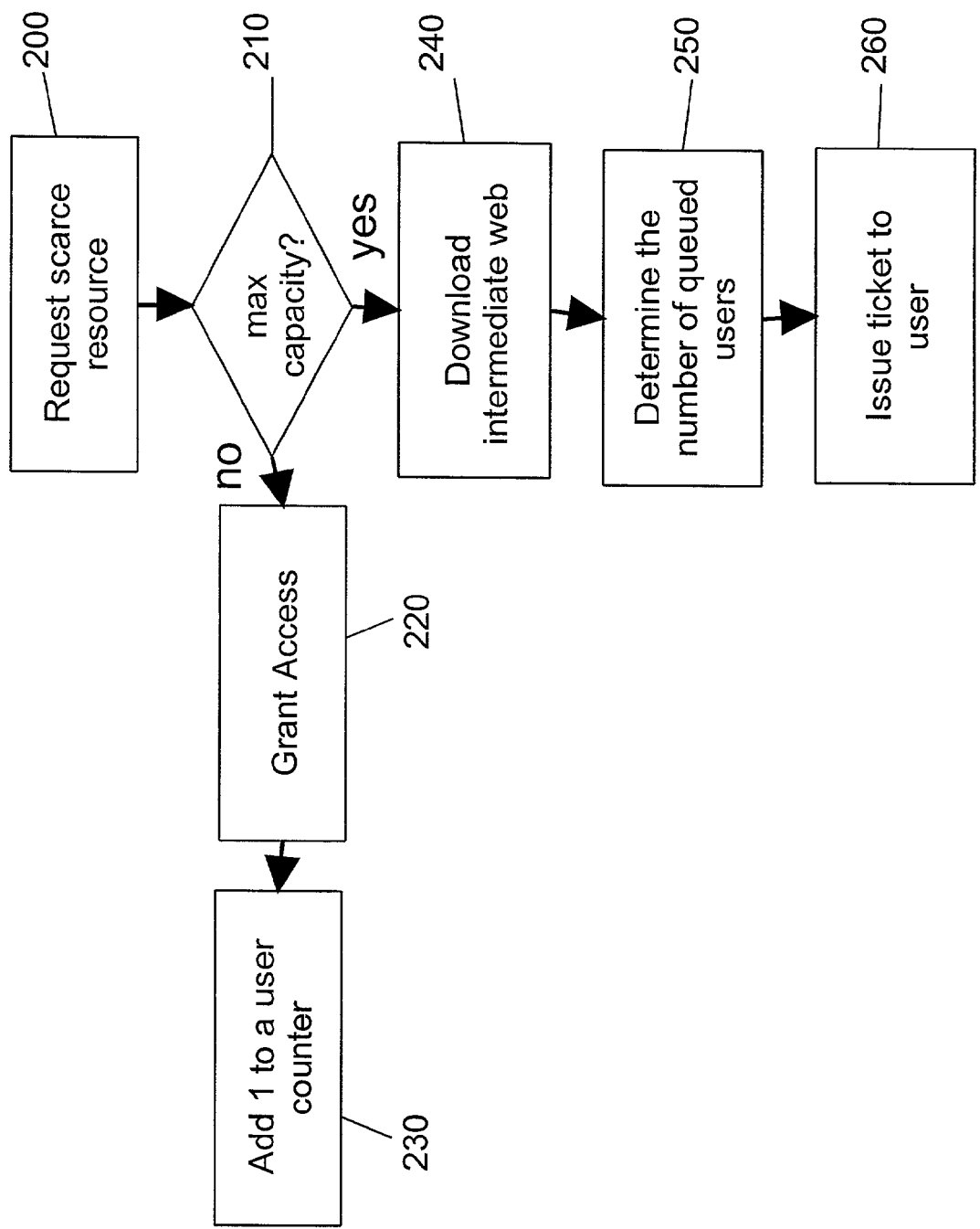
Figure 3B:
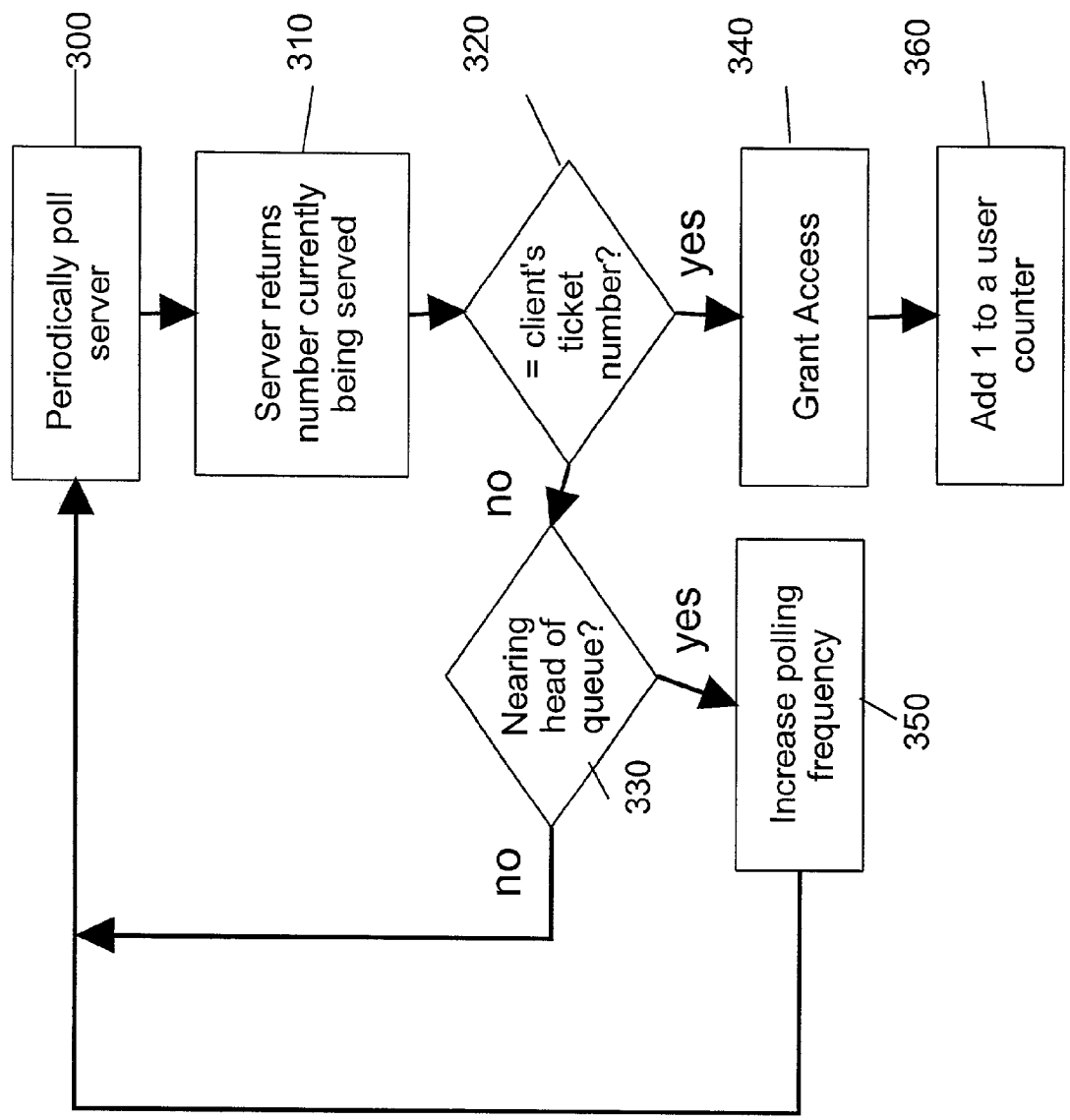

FIGS. 2, 3*a* and 3*b* illustrate web site access to a scarce resource (such as the checkout of FIG. 1) in accordance with a first embodiment of the present invention. Client 100 requests access to the scarce resource (web page 120) at step 200. The web page 120 resides on a server 110 and is requested by the client over the Internet 140.

At step 210 the server determines whether a desired maximum capacity access level for the scarce resource has been reached using max capacity component 150, which queries a user count 160. The user count keeps track of the number of people currently accessing the scarce resource. If the answer at step 210 is no, then access is granted to the scarce resource (step 220) and web page 120 is downloaded to the client (not shown). One is added to the user count 160 (step 230).

Conversely, if it is determined at step 210 that the server is at the desired maximum capacity for the scarce resource, then an intermediate web page 170 is downloaded from the server to the client 170' and a Java applet 130 is instantiated 130' within the web page 170'. The intermediate web page displays, by way of example, the notice "Sorry we are currently busy. You are being placed in a queue". The user is then provided with some form of entertainment whilst they wait. This could be adverts (perhaps including a selection of the shop's promotional/special offers); online gaming etc. If the entertainment is processor; memory; I/O etc. intensive then this is preferably located at a separate web server so as not to place undue load on the server hosting the scarce resource.

Figure 4:
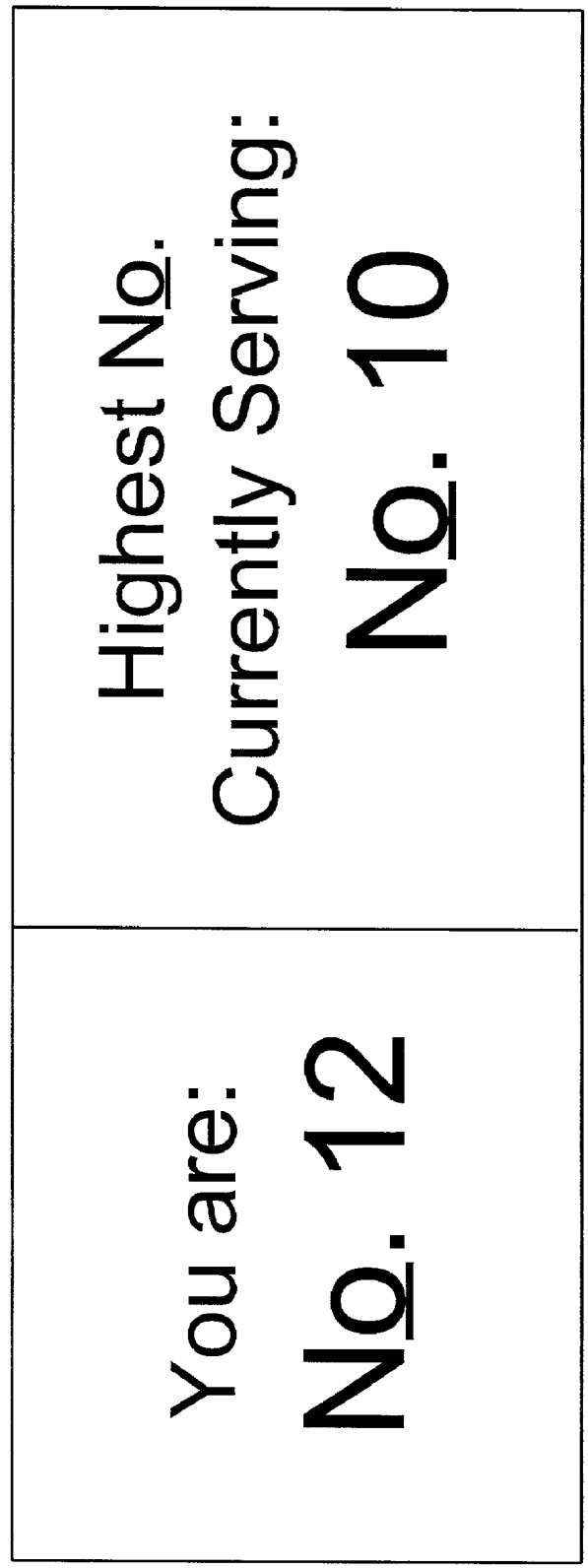
FIG. 4 shows a Java applet displayed to a user requesting access to a scarce resource in accordance with the first embodiment.

The server stores the number of the last ticket issued 180 and uses this at step 250 to issue the appropriate ticket number to the user at step 260. The Java applet 130' registers this number and displays it to the user. Periodically the client polls the server to find out the last ticket number currently being served (step 300). The server returns this number to the client at step 310 and this is also displayed to the user by the Java applet. FIG. 4 illustrates an example Java applet display. It will be appreciated that the server will typically be serving a range of tickets simultaneously.

When the server returns the ticket number currently being served at step 310, the Java applet uses this to determine whether the number returned is equal to the client's allocated ticket number (step 320). If the answer is yes then access is granted to the scarce resource (step 340) and one is added to the user count (step 360). Every time a user leaves the scarce resource one is subtracted from the user count. In the example given this is realised by a user submitting their purchase to the web site and receiving a "Your purchase has been processed. Thank you for shopping with BettaBuy" message. As one user leaves the scarce resource, the user at the head of the ticket queue is granted access to the scarce resource. (Note, in one embodiment there is a time-out period whereby a user is refused continued access to the scarce resource after a predetermined amount of time. The user count is then decremented. This ensures that a particular user does not have an unfair hold on the resource.)

If the answer at step 320 is no, then it is further determined whether the user is nearing the head of the queue (step 330). This is verified by comparing the user's ticket number with the number returned by the server at step 320 to see whether the two numbers are within a predetermined distance of one another (e.g. 4). If the user is not nearing the head of the queue, then the client-side Java applet 130' continues to periodically poll the server as before. If, on the other hand, the user is nearing the head of the queue then in this embodiment the polling frequency is increased at step 350. It will be appreciated that this step is optional.

In another embodiment, instead of increasing polling frequency, the Java applet attempts to keep the connection with the server open in order to receive a message from the server as soon as access is granted. The server preferably stores a list of the clients nearing the head of the queue such that it knows whom to send access messages to. It will be appreciated that a typical connection through an HTTP firewall typically prevents long running connections, but may still allow the connection to remain open for long enough to receive the access message from the server. If access has not been granted by the time the connection is dropped, then the Java applet either attempts to establish another connection or continues to poll for access periodically.

In the first embodiment, the number of the ticket currently being served is returned to the client. However, this is by way of example only and in an alternative embodiment an estimated time to wait is instead returned to the client. This is calculated based on based on the rate of change of the number being served. In one embodiment, the server uses a stop watch component (not shown) to calculate an average serving time per user. This is then used to provide each queued user with an estimated time to wait based on where they are in that queue.

It will be appreciated whilst this first embodiment has been described of in terms of a Java applet, that a javascript program; COM program or other executable program may equally be used.

Figure 5:
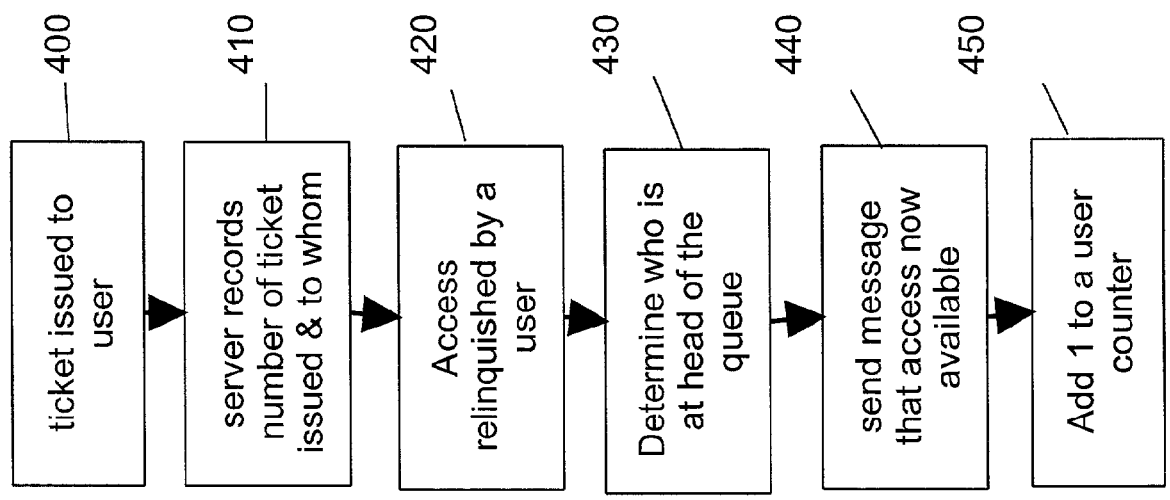
FIG. 5 illustrates web site access to a scarce resource according to a second embodiment of the present invention.

FIG. 5 illustrates web site access to a scarce resource according to a second embodiment of the present invention. When a user attempts to access the scarce resource and it is determined that the server is already at a desired maximum access level for that resource, the server issues the user with a numbered ticket (step 400). The server maintains a list of waiting clients (users) and a corresponding ticket number for each (step 410). Whenever a client relinquishes access to the scarce resource (step 420), the server determines which client is now at the head of the queue (step 430) and sends a message to that client granting access (step 440). One is added to a user count (step 450). The server also sends periodic update messages to each waiting client to keep them informed of their progress and this is displayed to the user. Once again a range of ticket numbers is typically served. It will be appreciated that in this embodiment the connection between the server and each client is preferably permanent to enable the server to initiate the messages to the client. As previously mentioned, a typical connection through an HTTP firewall typically prevents such a long running connection. However, in this embodiment, message broker environment is used to overcome this problem.

Figure 6:
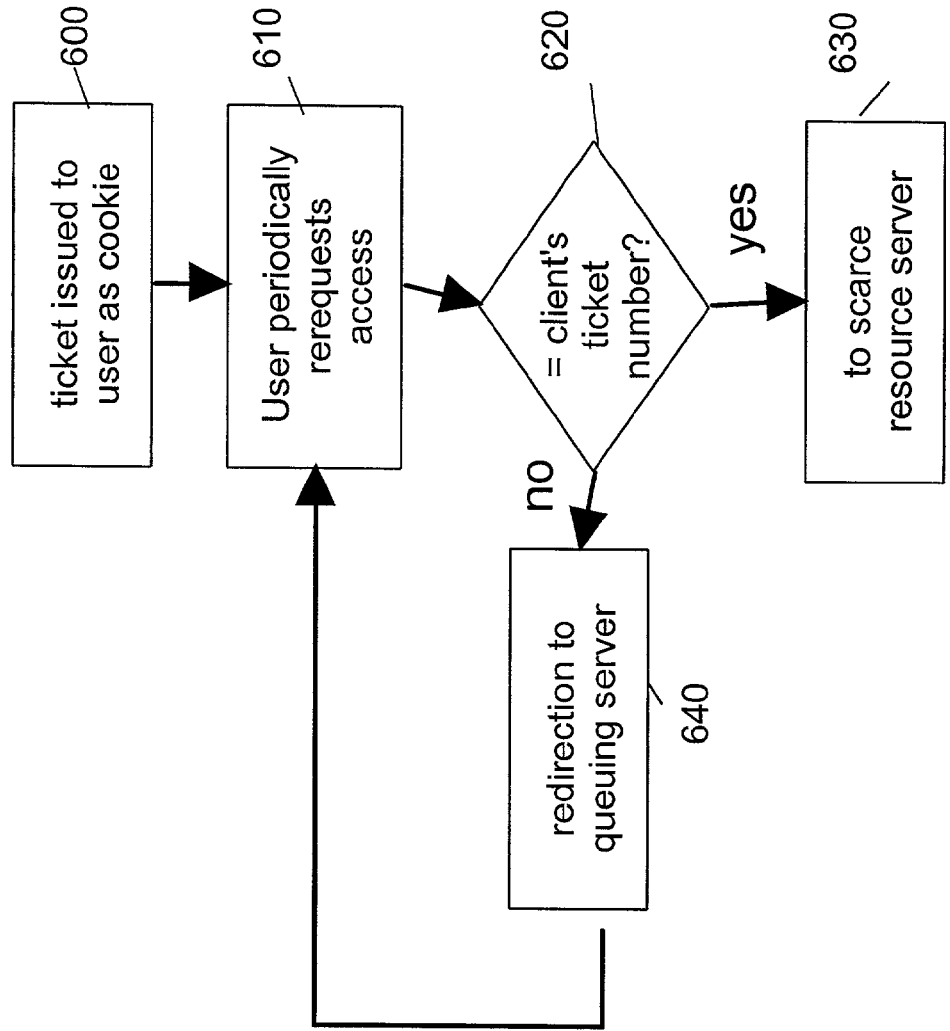
FIGS. 6 and 7 illustrate web site access to a scarce resource according to a third embodiment of the present invention.
Figure 7:
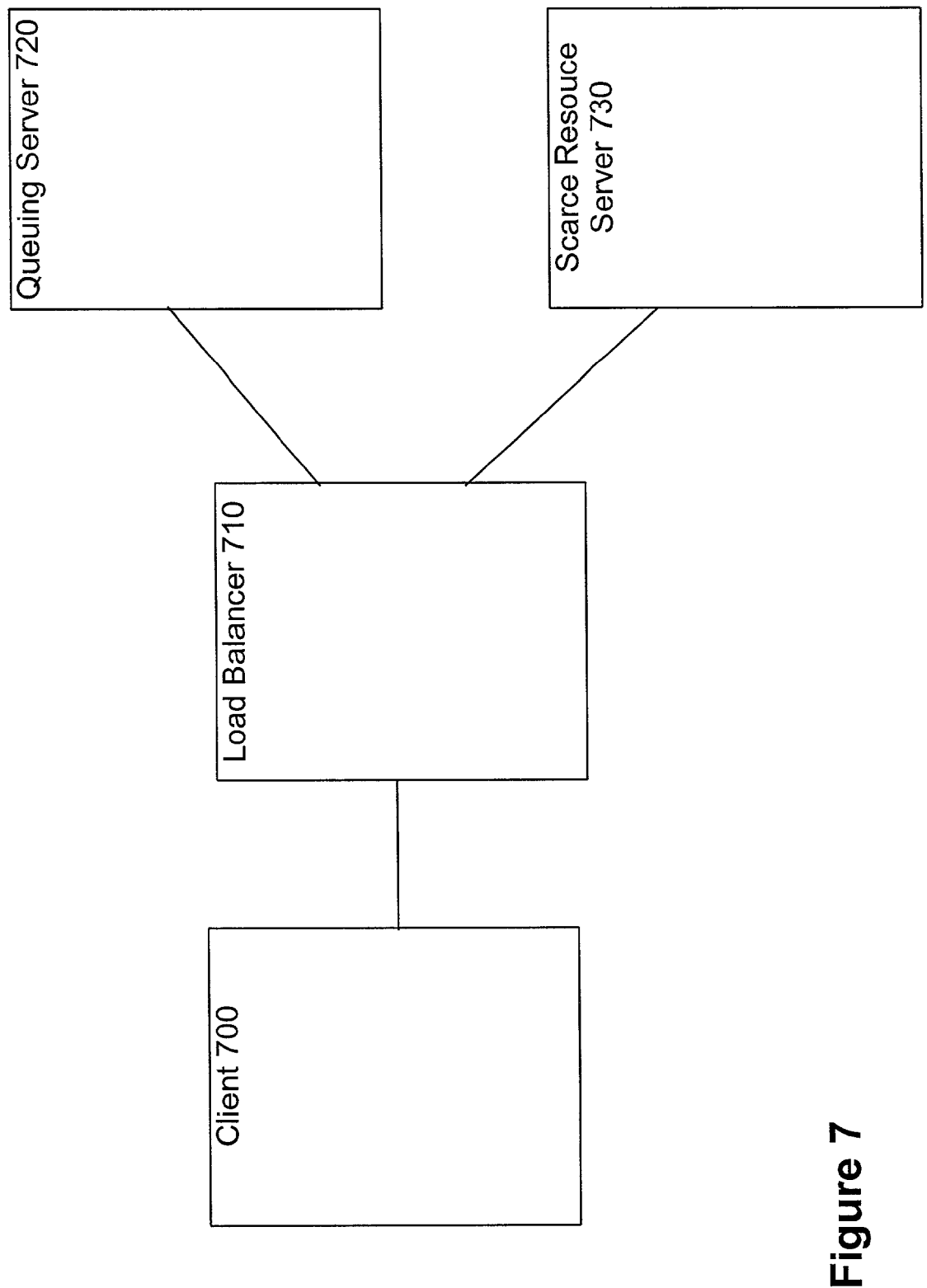

FIGS. 6 and 7 illustrate web site access to a scarce resource according to a third embodiment of the present invention. In this embodiment, a client attempts to connect to a server hosting a scarce resource. If it is determined that the server is already at a desired maximum access level for that resource, then a cookie is set which includes within it a ticket number (step 600). This is stored on the client's hard drive. Every time the client attempts to connect to the same web site, it presents this cookie to the server hosting the web site. The client makes such attempts at regular intervals (step 610). In one embodiment it does this by displaying a "Please click the browser reload button" message periodically to the user. In another embodiment, the web page from which the user can request access to the scarce resource contains an HTML client refresh tag. This tag forces a specified page (URL) to reload automatically every N seconds and takes the effort away from the user. It is of the form:

```
<META HTTP-EQUIV="REFRESH"
    CONTENT=N; URL=HTTP://www.bettabuy-
    .com/scarceresource.html">
```

In yet another embodiment, the web page from which access can be requested contains some javascript for achieving the automatic page refresh every N seconds. It will be appreciated that the above are examples only and the invention is in no way limited to such. Preferably the refresh rate is modified (i.e. increased) as the user's ticket number is neared.

Continuous attempts to reload the page providing access to the scarce resource would impact the performance of the server hosting the scarce resource. Thus FIG. 7 depicts a solution in accordance with the third embodiment. Requests by client 700 are initially directed to a content-filtering load balancer 710 such as WebSphere Edge Server available from IBM Corporation. The load balancer is adapted to receive a feed of information regarding which tickets are currently being served from scarce resource server 730. As in the first embodiment, the load balancer tracks whether the scarce resource is at a desired maximum capacity level and keeps a note of the number of users currently accessing the scarce resource and the number of the last ticket issued. If at step 620 the client's ticket number is equal to a ticket at the head of the queue then the client's request is directed to the scarce resource Thus FIG. 7 depicts a solution in accordance with the third embodiment. Requests by client 700 are initially directed to a content-filtering load balancer 710 such as WebSphere Edge Server available from IBM Corporation. The load balancer is adapted to receive a feed of information regarding which tickets are currently being served from scarce resource server 730. As in the first embodiment, the load balancer tracks whether the scarce resource is at a desired maximum capacity level and keeps a note of the number of users currently accessing the scarce resource and the number of the last ticket issued. If at step 620 the client's ticket number is equal to a ticket at the head of the queue then the client's request is directed to the scarce resource server 730 at step 640. If the answer is no at step 620 then the client's request is directed to a queuing server 720 at step 630. The queuing server preferably provides the user with some form of entertainment whilst they wait as well as their ticket number and current queue position. The client periodically rerequests access to the scarce resource and is redirected back to the queuing server until their ticket number is ready to be served by the scarce resource server. In one embodiment, the entertainment is placed in one frame, whilst the refresh reloads a separate frame. This means that the user does not have to leave the entertainment only to be informed that the scarce resource server is still not ready for the user. Of course the user does not necessarily have to be directed to a separate server in order to receive the entertainment. However if that entertainment is processor; memory; I/O etc. intensive, then this solution is preferable.

In one embodiment, no load balancer is used. Instead the user attempts to connect to an access URL. A servlet behind the access URL determines (using the cookie presented to it by the client) whether access can be granted. If the answer is no, then an intermediary web page is loaded informing the user of queue position and providing them with some form of entertainment. On the other hand, if access can be granted, then the servlet redirects the client to the appropriate scarce resource URL.

In another embodiment, a combination of a cookie and a Java applet is used. When a user first attempts to connect to a scarce resource, a copy of the Java applet is instantiated on their machine. The applet then periodically requests queue position information. If the user wishes to leave the confines of the web site associated with the scarce resource behind, then the applet uses a cookie to register its queue number. The cookie is stored on the client's hard drive and the user may explore the rest of the web or even disconnect from the Internet completely. When the user attempts to reconnect to the scarce resource, the cookie is presented and compared with the ticket number currently being served. Processing can then continue with step 620 of FIG. 6. Alternatively an applet is instantiated on the client. Rather than receive a ticket number from the server, the ticket number stored in the cookie is registered with the applet and processing continues with step 320 of FIG. 3*b*.

In a further embodiment a separate application is downloaded to a client requesting access to a scarce resource. In this way the user is free to browse other parts of the web, whilst the application periodically attempts to connect to the scarce resource in the background. In one embodiment, when access is finally granted a new browser session is launched and the scarce resource is then displayed therein to the user. This means that if the user is in the midst of, for example, a transaction at another web site this is not interrupted. Of course, the scarce resource could be just as easily be displayed in the current browser session. In yet another embodiment, notification is provided to the user that access is now available and they can attempt to connect at their leisure. Of course this runs the risk that the user will miss out on access (i.e. if another ticket number is called) and may not be allowed in.

It will be appreciated that any combination of the embodiments described is also possible and also that the embodiments described are by way of example only.

It will be appreciated that it is possible for a client to miss its ticket number. Whether such users can be accommodated is dependent upon the amount of spare server capacity available. For example, whilst the server may already be at a desired maximum capacity for the scarce resource, the server may still be able to cope with one or two latecomers without the performance degradation being too great. The server may of course subsequently adjust the rate of admission for the other queued users.

It will further be appreciated that whilst the invention has been described in terms of access to a scarce resource via a web interface, the invention is not limited to such. By way of example, it is relevant to access to any application in a client-server environment.

Moreover, whilst the term user has been used throughout, it will be appreciated that this should be taken as encompassing a client-side application.

It should also be noted that the scarce resource may actually comprise a chain of resources. Entry to each resource/at least some of the resources in the chain may also be ticketed.

What is claimed is:

1. A method for regulating access by users to a scarce resource, said resource being capable of handling multiple concurrent accesses, the method comprising the steps of:
receiving a request for access to the scarce resource;
determining whether the access level for said scarce resource is at a desired maximum, the desired maximum indicating a predetermined maximum number of users, the desired maximum indicating a plurality of users and being independent of a maximum physical capacity for the scarce resource, that it is desired be simultaneously accessing the scarce resource;
responsive to determining that said access level is at a desired maximum, placing said requester in a queue for access to said scarce resource;
providing said requester with a notification that the request has been enqueued, access being available to said requester upon reaching the head of the queue and said access level dropping below said desired maximum,
receiving a late request for access to said scarce resource;
identifying the late request as being one from said requester that was previously enqueued but for which access was missed when it became available;
determining, upon receipt of the late request, whether the access level for said scarce resource is currently at a desired maximum;
responsive to determining that said access level is currently at a desired maximum, determining whether said scarce resource is able to accommodate immediate access by said late requester;
responsive to determining that it is possible to accommodate immediate access, by said requester, granting immediate access to said requester; and
responsive to determining that it is not possible to accommodate immediate access by said requester, re-queuing said requester;
wherein an enqueued user may remain enqueued while navigating an application used to access the scarce resource away from the scarce resource.

2. The method of claim 1 further comprising the step of:
periodically providing said requester with updates on said requester's progress through the queue.

3. The method of claim 2, further comprising:
issuing said requester with a numbered ticket denoting said requester's position in the queue.

4. The method of claim 3, wherein said number is displayed to the requester.

5. The method of claim 3, wherein the step of periodically providing the requester with updates on said requester's progress through the queue comprises:
informing said requester of the ticket number of the last user granted access to said scarce resource.

6. The method of claim 3, comprising:
calculating the average time taken to serve the holder of each ticket number; and
providing said requester with an estimated time to wait based on said calculated average.

7. The method of claim 2, wherein the step of periodically providing the requester with updates is responsive to the requester polling for such updates.

8. The method of claim 7, comprising the step of:
downloading onto said requester's computer an executable program for initiating said polling.

9. The method of claim 1, comprising the steps of:
storing information on said requester's position in the queue and information for the purpose of providing the requester with notifications, said positional information being continually updated as said requester progresses through the queue.

10. The method of claim 9, comprising the step of:
initiating periodic updates to the requester on said requester's progress through the queue.

11. The method of claim 9, further comprising the step of:
providing the requester with a notification when access to the scarce resource is available.

12. The method of claim 9, wherein the step of storing requester information is responsive to determining that said requester is within a predetermined threshold of the head of said queue.

13. The method of claim 1, comprising the step of:
responsive to said requester re-requesting access to said scarce resource, providing the requester with an update on the requester's progress through the queue.

14. The method of claim 13, wherein each re-request presents a ticket number issued to the requester upon being placed in said queue, said method further comprising the step of:
using said presented ticket number to determine whether access is available to said requester; and
responsive to determining that access is available granting said access.

15. The method of claim 14, wherein the step of granting access comprises:
diverting said requester to a first server hosting said scarce resource.

16. The method of claim 14, comprising the step of:
responsive to determining that access is not available, diverting said request to a second server, said second server providing the requester with entertainment whilst in said queue.

17. The method of claim 1, comprising the step of:
providing said requester with entertainment whilst said requester in the queue.

18. The method of claim 17, wherein said entertainment is remote from the scarce resource.

19. The method of claim 1, wherein the step of determining whether said access level for said scarce resource is at a desired maximum comprises:
tracking the number of users currently accessing the scarce resource; and
comparing said number with a predetermined maximum value.

20. An apparatus for regulating access by users to a scarce resource, said resource being capable of handling multiple concurrent accesses, the apparatus comprising:
a processor; and
a memory, the memory including:
means for receiving a request for access to the scarce resource;
means for determining whether the access level for said scarce resource is at a desired maximum, the desired maximum indicating a predetermined maximum number of users, the desired maximum indicating a plurality of users and being independent of a maximum physical capacity for the scarce resource, that it is desired be simultaneously accessing the scarce resource;
means, responsive to determining that said access level is at a desired maximum, for placing said requester in a queue for access to said scarce resource;
means for providing said requester with a notification that the request has been enqueued; access being available to said requester upon reaching the head of the queue and said access level dropping below said desired maximum;
means for receiving a late request for access to said scarce resource;
means for identifying the late request as being one from said requester that was previously enqueued but for which access was missed when it became available; from said requester having missed access when available;
means for determining, upon receipt of the late request, whether the access level for said scarce resource is currently at a desired maximum;
means for determining, responsive to determining that said access level is currently at a desired maximum, whether said scarce resource is able to accommodate immediate access by said late requester;
means, responsive to determining that it is possible to accommodate immediate access by said requester, for granting immediate access to said requester; and
means, responsive to determining that it is not possible to accommodate immediate access by said requester, for re-queuing said requester;
wherein an enqueued user may remain enqueued while navigating an application used to access the scarce resource away from the scarce resource.

21. The apparatus of claim 20 further comprising:
means for periodically providing the requester with updates on said requester's progress through the queue.

22. The apparatus of claim 21, further comprising:
means for issuing said requester with a numbered ticket denoting said requester's position in the queue.

23. The apparatus of claim 22, wherein said number is displayed to the requester.

24. The apparatus of claim 22, wherein the means for periodically providing the requester with updates on said requester's progress through the queue comprises:
means for informing said requester of the ticket number of the last user granted access to said scarce resource.

25. The apparatus of claim 22, comprising:
means for calculating the average time taken to serve the holder of each ticket number; and
means for providing said requester with an estimated time to wait based on said calculated average.

26. The apparatus of claim 21, wherein the means for periodically providing the requester with updates is responsive to the requester polling for such updates.

27. The apparatus of claim 26, comprising:
means for downloading onto said requester's computer an executable program for initiating said polling.

28. The apparatus of claim 20, comprising:
means for storing information on said requester's position in the queue and information for the purpose of providing the requester with notifications, said positional information being continually updated as said requester progresses through the queue.

29. The apparatus of claim 28, comprising:
means for initiating periodic updates to the requester on said requester's progress through the queue.

30. The apparatus of claim 28, further comprising the step of:
providing the requester with a notification when access to the scarce resource is available.

31. The apparatus of claim 28, wherein the means for storing requester information is responsive to means for determining that said requester is within a predetermined threshold of the head of said queue.

32. The apparatus of claim 20, comprising:
means, responsive to said requester re-requesting access to said scarce resource, for providing the requester with an update on said requester's progress through the queue.

33. The apparatus of claim 32, wherein each re-request presents a ticket number issued to the requester upon being placed in said queue, said apparatus further comprising:

means for using said ticket number to determine whether access is available to said requester; and means, responsive to determining that access is available, for granting said access.

34. The apparatus of claim 33, wherein the means for granting access comprises:

means for diverting said request for access to a first server hosting said scarce resource.

35. The apparatus of claim 34, comprising:

means, responsive to determining that access is not available, for diverting said request to a second server, said second server providing the requester with entertainment whilst in said queue.

36. The apparatus of claim 20, comprising:

means for providing said requester with entertainment whilst said requester in the queue.

37. The apparatus of claim 36, wherein said entertainment is remote from the scarce resource.

38. The apparatus of claim 20, wherein the means for determining whether said access level for said scarce resource is at a desired maximum comprises:

means for tracking the number of users currently accessing the scarce resource; and means for comparing said number with a predetermined maximum value.

* * * * *